United States Patent [19]
Niese

[11] Patent Number: 5,070,662
[45] Date of Patent: Dec. 10, 1991

[54] INSERT FOR LOCKING PORTABLE DANCE FLOOR SECTIONS

[75] Inventor: Michael W. Niese, Cincinnati, Ohio

[73] Assignee: Robbins, Inc., Cincinnati, Ohio

[21] Appl. No.: 523,602

[22] Filed: May 15, 1990

[51] Int. Cl.$^5$ .............................. E04B 1/61; E04B 2/82
[52] U.S. Cl. .................................. 52/127.7; 52/127.11;
52/392; 52/811; 52/741; 403/362; 411/178;
411/393
[58] Field of Search ....................... 52/392, 126.5, 811,
52/309.9, 309.2, 595, 127.11, 592, 127.7, 741;
403/362; 411/178, 393; 404/35, 40, 41

[56] References Cited
U.S. PATENT DOCUMENTS

| | | |
|---|---|---|
| 187,502 | 2/1877 | Banker . |
| 238,375 | 8/1883 | Chatain ................................. 52/584 |
| 791,548 | 6/1905 | Fischer ................................. 403/362 |
| 958,557 | 5/1910 | Stiggleman . |
| 1,661,226 | 3/1928 | Martin . |
| 2,138,085 | 11/1938 | Birtles ................................. 52/584 |
| 2,142,388 | 1/1939 | Wallace ................................. 52/584 |
| 2,381,469 | 8/1945 | Sweet . |
| 2,400,318 | 5/1946 | Rosan ................................. 411/178 |
| 2,442,184 | 5/1948 | Summers ............................ 403/147 |
| 2,503,860 | 4/1950 | Williams . |
| 2,505,215 | 4/1950 | Siegerist . |
| 2,571,641 | 10/1951 | Wing ................................. 411/393 |
| 2,663,915 | 12/1953 | Dietrich ............................. 52/293 |
| 2,871,077 | 1/1959 | Mutchnik ........................... 403/284 |
| 3,017,657 | 1/1962 | Mills ................................. 16/114 |
| 3,040,338 | 6/1962 | Zeleny et al. . |
| 3,175,476 | 3/1965 | Franks ................................. 404/35 |
| 3,192,574 | 7/1965 | Jaffe et al. . |
| 3,308,587 | 3/1967 | Gilroy et al. ...................... 52/126.5 |
| 3,310,919 | 3/1967 | Bue et al. ............................ 52/811 |
| 4,100,710 | 7/1978 | Rosan ................................. 52/595 |
| 4,318,636 | 3/1982 | Thomas ............................. 52/584 |

FOREIGN PATENT DOCUMENTS 403207 11/1965 Switzerland .

Primary Examiner—James L. Ridgill, Jr.
Attorney, Agent, or Firm—Wood, Herron & Evans

[57] ABSTRACT

An insert and set screw for locking together the tongue and groove elements of adjacently situated sections of a portable floor in a manner which prevents upward movement of both the set screw and the insert beyond the top surface of the floor. The insert has a flared bottom end that is located in a floor section, above a groove in the groove element, and the set screw is threadably received within the insert. The set screw is tightened downwardly to contact and then compress upon a tongue element of an adjacently situated floor section that has been inserted within the groove element, thereby locking the tongue and groove elements together. The flared bottom end of the insert prevents it from moving upwardly into the plane of the top surface. Stop means inside the insert limit upward movement of the set screw. Both the insert and the set screw are physically restricted from protruding above the top floor surface.

16 Claims, 1 Drawing Sheet

INSERT FOR LOCKING PORTABLE DANCE FLOOR SECTIONS

FIELD OF THE INVENTION

This invention relates to portable floors such as aerobics, sport or dance floors, formed from a plurality of interconnecting panel sections joined by a tongue and groove coupling, and more particularly to apparatus for locking a tongue and groove coupling between adjacently situated portable floor sections.

BACKGROUND OF THE INVENTION

Portable floors, such as dance floors, for example, provide versatility and efficiency in the use of floor space. A typical portable dance floor includes a number of portable sections which may be conveniently connected for use when a dance floor is required, and then disconnected and stored in a storage space when not in use. Typically, these portable sections include wooden parquet panels which provide an aesthetically pleasing surface for dancing, mounted over a sub-layer having cooperating, metal tongue and groove coupling elements located respectively around the perimeter of the respective sections for connection in side-by-side relationship with adjacently situated sections. Exterior channels border the outer perimeter of the connected floor sections, and taper downwardly at an angle to the base surface upon which the portable dance floor is supported.

A prior portable dance floor of this type is disclosed in Bue et al. U.S. Pat. No. 3,310,919. This patent discloses a lockable tongue and groove structure for connecting adjacently situated sections. This locking structure includes a groove defining channel element associated with one floor section and a tongue defining element associated with an adjacent section. Access holes are provided in the parquet panels situated along the length of the sections above the groove elements. The access holes are aligned with corresponding bores in an upper leg portion of the channel member which forms the groove. An externally threaded set screw is inserted from above the dance floor surface into each access hole and aligned bore until the bottom of the set screw contacts and compresses the inserted tongue, thus locking the sections together. Typically, the tongue has a thick forward end and is tapered rearwardly to a thinner crosssection at its juncture with the floor section on which it is mounted.

It is also known to utilize, in each aligned access hole and bore, a sleeve-like insert. External threads permit it to be threaded into the floor section. Internal threads are provided for an externally threaded set screw threadably received within the insert. Typically, the set screws have an Allen socket and are accessible for tightening from above the floor through the access holes.

Twisting of such a set screw moves it downward within the insert and into contact with the tongue of an adjacently situated floor section, thereby locking the tongue in place between the upper and lower channel legs forming the groove, and connecting the adjacently situated sections in side-by-side relationship.

Since the groove defining channel is usually aluminum and thus soft, threads in it are easily stripped. Set screws used without inserts tended to strip out threads in such channels. The harder metal insert has been an attempt to eliminate that problem.

The conventional tongue and groove coupling between adjacently situated floor sections has proven convenient for assembly and disassembly. However, these particular locking mechanisms suffer from a major disadvantage resulting from the tendency of the set screw, the threaded insert when used, or both the insert and the set screw to back out or strip out upwardly above the upper panel or floor surface of the connected sections, particularly when improperly tightened or untightened by the user. Upward protrusion of the set screw or the insert above the floor exposes the insert or screw to damage from adjacent sections when handled for storage. This could result in bending of the screw or insert when hit by a separate section, or the screw or insert could cause surface damage to an adjacent panel.

It is therefore an object of this invention to provide an improved simple and effective locking mechanism for maintaining a tongue and groove coupling between adjacently situated portable dance floor sections.

A further objective of the invention has been to prevent stripping of the threads associated with the tongue and groove locking device.

It is another object of this invention to provide a simple locking mechanism for locking a tongue and groove coupling between adjacently situated portable dance floor sections in which the components of the locking mechanism are not susceptible to upward protrusion above the dance floor surface.

SUMMARY OF THE INVENTION

This invention contemplates an insert and set screw for locking a tongue and groove connection between adjacently situated sections of a portable dance floor in a manner which positively prevents upward protrusion above the dance floor of both the inert and the set screw.

In accordance with a preferred embodiment of the invention, a cylindrical, sleeve-shaped set screw receiving insert has an enlarged or flared bottom end, external threads extending along the exterior surface from the flared end to the top end, and internal threads within the insert sized to receive a set or locking screw. The internal threads terminate short of a protrusion, rim or stop means located internally at the top end of the insert sleeve. The set screw has an upper socket accessible for twisting the screw through the top end of the insert.

In its installed position in a floor section, the flared bottom end of the insert is in contact with the lower surface of the upper groove forming leg of the groove defining channel. The insert is shorter than the distance between such lower surface and the dance floor panel surface such that the flared end thereby physically prevents upward protrusion of the top end of the insert beyond the surface of the dance floor. Moreover, the stop means in the insert limits upward movement of the set screw beyond the upper insert end, thereby preventing upward protrusion of the set screw above the dance floor surface. The upwardly directed socket of the set screw is nevertheless accessible through the top end of the insert and through a corresponding small hole in the floor section thereabove. By twisting the set screw in a downward direction, independent of the insert, the bottom of the set screw eventually contacts and locks the tapered tongue element of a second, adjacently situated floor section which has been inserted into the groove forming channel element. The downward compression exerted by the set screw locks the tongue and groove elements together.

Downward tightening of the set screw from above the floor surface not only provides a downward compressive force against the inserted tongue, but also urges the flared head of the insert in an upward direction against the lower surface of the upper groove leg of the groove element or channel, thereby further enhancing the structural integrity of the dance floor.

According to a preferred method of installation, an installation hole large enough to accept the flared insert end is drilled in the lower groove defining leg. The insert is introduced upwardly through this access or installation hole. The insert is moved upwardly through the groove, and then threaded into a threaded bore in the upper groove defining leg and into an aligned hole in the wooden floor panel situated thereabove. The hole is preferably slightly undersized with respect to the outer diameter of the insert so that the insert is frictionally held in place. Final upward tightening of the insert may be performed by use of an insert driver, or by placing a screw driver in a slot at the flared bottom end of the insert and rotating the insert to move upwardly until the flared bottom end contacts the lower surface of the upper groove leg. The set screw is then threaded from the underside of the floor section upwardly through the lower groove leg and into the insert. Alternately, rather than a flared bottom end, another bottom end shape or another portion of the insert may be oversized with respect to a surface of the groove leg to physically restrict upward insert movement.

On site, the tongue of one floor section is then inserted into the groove of an adjacent section until the sections are abutting and in side-by-side relationship, with the individual upper panel surfaces thereof aligned in a common upper horizontal plane or floor surface. The set screw is then tightened downwardly with an Allen wrench from above the floor surface, thereby exerting a compressive locking force upon the tongue. Even if the set or locking screw loosens, the insert's internal stop means prevent it from rising above the floor surface. The flared end of the insert prevents it from rising above the floor surface.

For disassembly of the sections, the set screw is unscrewed, from above, upwardly away from the tongue and into the insert until the tongue can be retracted from the groove without interference. The internal stop means of the insert still prevents extension of the loosened set screw above the upper horizontal plane of the floor surface. The separate floor sections may be then carried to a storage space and stored together until needed again without concern for damage due to protruding inserts or set screws. The insert/set screw combination preferably remain in place within the floor sections during storage.

According to one feature of the invention, when the flared insert end is slotted, the external threads of the insert are preferably left-handed while the internal threads are right-handed. This assures that downward rotation of the set screw will not also rotate the insert downwardly within the floor section. That might otherwise occur in cases where the insert and set screw have become bound or locked together and when the threads are of similar twist. To enhance the permanent position of the insert, an appropriate adhesive or locking compound can be used.

This invention thus effectively prevents undesired upward protrusion of an insert and a set screw above a dance floor surface.

These and other features and advantages of the invention will be more readily understood in view of the following detailed description of a preferred embodiment of the invention and from the drawings in which:

DETAILED DESCRIPTION OF THE DRAWINGS

Figure 1:
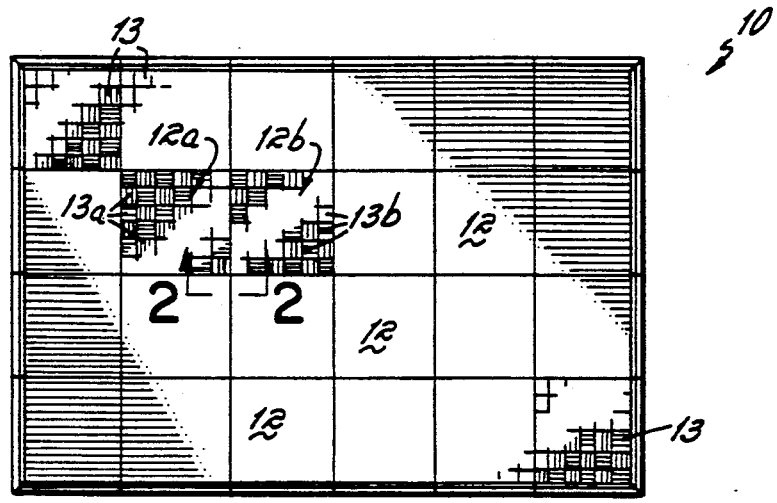
FIG. 1 a plan view of a portable dance floor in accordance with the preferred embodiment of the invention.

FIG. 1 shows a top, or plan view of a portable dance floor 10 in accordance with a preferred embodiment of the invention. Although not critical to the invention, the dance floor 10 is usually rectangular, square, T-shaped, L-shaped, etc. and preferably consists of a plurality of square-shaped connectable sections or panels 12 which define the overall shape of the floor 10. Border elements surround the outer periphery of the floor 10. These taper downwardly to the supporting surface below. Any suitable border element construction can be used. Each section 12 includes one or more parquet, strip or other floor elements, or wooden panels 13, according to a desired configuration. The particular configuration is not critical to this invention.

Adjacently situated sections 12a and 12b (FIG. 2) are connected in side-by-side relationship along a vertical plane 14, with top surfaces thereof aligned in a horizontal plane 15. Sections 12a and 12b include multiple parquet panels, designated 13a and 13b, respectively. However, the number of parquet panel elements 13 per floor section 12 is not critical to the invention.

The interconnection between sections is formed by the insertion of a tongue 18 of tongue element 19 within a groove 20 of groove element 21, the tongue and groove elements comprising a coupling means. It is to be understood that elements 19 and 21 are preferably aluminum channels that preferably extend the length of the respective sections.

Figure 2:
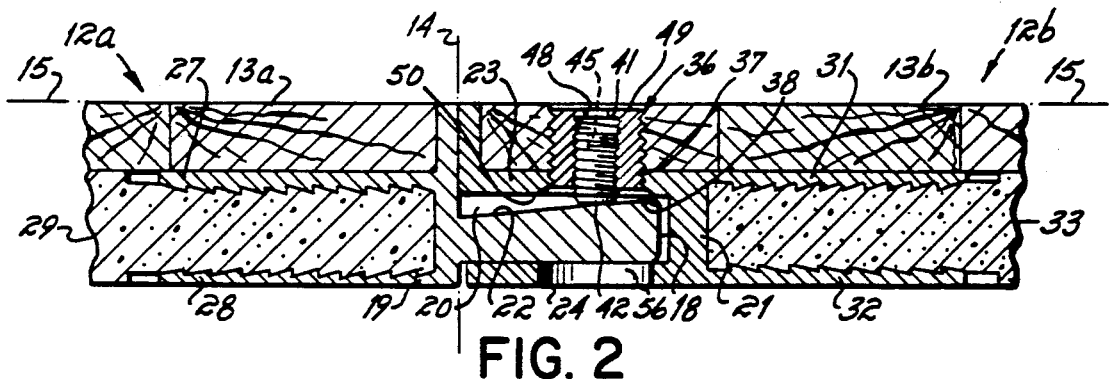
FIG. 2 is a cross sectional view taken along lines 2—2 of FIG. 1.

The groove 20 is defined by an upper leg 23 and a lower leg 24 of element 21. Each element also includes upper and lower detented arms which extend away from vertical plane 14. As shown in FIG. 2, upper arm 27 and lower arm 28 to element 19 extend to the left, gripping the filler material or base layer 29 to attach element 19 to the panel 12a. On the opposite side of plane 14, groove element 21 includes upper arm 31 and lower arm 32 gripping the base layer 33 of panel 12b. The upper dance floor parquet or strip panel surfaces are secured to the base layers by adhesive.

The tongue 18 extends outwardly from element 19 into groove 20. A top surface 22 of tongue 18 recedes or tapers rearwardly and downwardly, as viewed in FIG. 2, from a forward thick end of the tongue to a thinner tongue portion at plane 14.

A tongue and groove locking means includes an insert 36 and a locking or set screw 41. Insert 36 is situated within a bore 37 in top leg 23 of groove element 21. A bottom end 38 of the insert 36 is oversized, or flared and is too large to fit into the bore 37. Preferably, the insert 36 is externally threaded and is threadably received within bore 37. Installation of the insert 36 within bore 37 may be accomplished with an insert driver placed inside the insert 36. Alternately, slots 60 are provided in flared end 38 so that a screw driver may be used to rotate the insert 36 upwardly into the bore 37. While the insert 36 may be made of brass or other material, it is preferably formed of steel.

Set screw 41 is screwed in an upward direction within the insert 36 until the set screw 41 reaches the top end of the internal threads, or until it contacts with some other stopping means, such as rim 58. Thereafter, when tightened downwardly from above, with an Allen wrench via an Allen wrench socket 45, a bottom surface 42 of set screw 41 contacts and exerts downward force upon the tapered top surface 22 of tongue 18. Access to the socket 45 is provided through an opening 48 formed in a top end 49 of the insert 36, and a hole 55 in the panel 12b located thereabove. The aligned bore 37 and hole 55 define a passage for access to socket 45 through top end 49 of insert 36.

Figure 3:
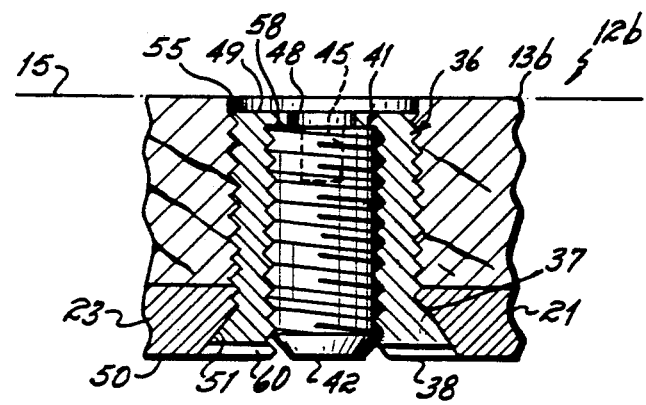
FIG. 3 is an enlarged view of an insert and set screw configuration for locking the tongue and groove connection between separate sections of a portable dance floor in accordance with the preferred embodiment of the invention.

The physical contact between flared bottom end 38 and a lower surface 50 of the upper groove leg 23, together with the predetermined length of the insert 36 prevents the top end 49 of insert 36 from extending above horizontal plane 15. As shown in FIGS. 2 and 3, the lower surface 50 of groove forming leg 23 is countersunk to correspond to flared end 38.

Internal threads of insert 36 terminate short of top end 49. Rim or stop means 58 is provided thereabove to physically restrict set screw 41 from protruding outwardly of the insert, or above plane 15. Alternately, a pin or any other physically restricting mechanism or stop means could be employed for this purpose.

The insert 36 and set screw 41 is shown in greater detail in FIG. 3. Set screw 41 is threaded upwardly into an upper position within insert 36. In this position, bottom surface 42 of set screw 41 is contiguous with lower surface 50 of upper groove forming leg 23. This permits unimpeded insertion and retraction of tongue 18 in and from groove 20 during connection or disassembly of the adjacently situated panel sections 12a and 12b. When set screw 41 is in this uppermost position within insert 36, clockwise turning of the set screw 41 via socket 45 from above the plane 15 will cause the set screw 41 to move downwardly toward the inserted tongue and will urge the insert upwardly against the groove element, enhancing structural integrity.

On installation, the insert 36 is first introduced upwardly through an access aperture 56 in bottom groove-forming leg 24, with flared end 38 oriented downwardly. The top end 49 of insert 36 is then threaded into bore 37 by an insert driver until flared end 38 contacts the countersunk lower surface 50. The set screw 41 is then rotated into the insert 36 from below to move the set screw 41 upwardly toward stop rim 58.

After installation of the insert and set screw, separate sections 12 can be joined to form a dance floor. Adjacently situated floor sections 12a and 12b are connected together by inserting tongue 18 into groove 20. Thereafter, the set screw 41 is then rotated downwardly with an Allen wrench from above plane 15, thereby causing the set screw 41 to eventually contact, apply compressive force to tongue 18. In this condition the thick end of the tongue cannot be withdrawn from the groove and the floor sections 12 are locked together. When the flared end of the insert is slotted and the external threads of the insert 36 are left-handed, downward rotating of the set screw 41 cannot also move the insert 36 in a downward direction. Similarly, the other sections 12 of the floor 10 are connected along their marginal edges, and the border or peripheral elements are similarly connected to complete the floor 10.

When dance floor 10 is to be disassembled, each set screw 41 is accessed from above plane 15 and unscrewed upwardly within its respective insert 36 until the tongue 18 may be retracted from the groove 20. The insert 36 and set screw 41 remain in place during storage, as shown in FIG. 3, which depicts set screw 41 located in an uppermost threaded position. Both of these elements 36 and 41 are thus retained within the floor section and are not extended where they could be subjected to damage, or might cause damage.

While the above description constitutes a preferred embodiment of this invention, various other alternative embodiments will be apparent to a person skilled in the art. For instance, particular reference herein has been made to dance floors, but the invention could be used with other portable floors for a variety of uses. Moreover, while the tongue and groove elements have been described as extending along the marginal edges of adjacently situated floor sections, this is not critical to the invention. Other configurations utilizing a tongue and groove coupling which does not extend along the entire length of a marginal edge would certainly be possible, and are considered within the scope of this invention.

Accordingly, it is to be understood that other modifications may be made without departing from the scope of the invention. Applicant thus intends to be bound only by the claims appended hereto.

I claim:

1. A portable floor comprising connectable sections comprising:

a first section having an upper floor surface;

a second section situated adjacent said first section and having an upper floor surface contiguous with said first section upper floor surface in a common upper floor surface plane;

a tongue element connected to said first section;

a groove element connected to said second section, said groove element having spaced apart upper and lower groove defining surfaces therein for receiving said tongue element;

an insert within said second section and extending substantially between said upper groove defining surface and said upper floor surface plane, said insert having a flared bottom end coacting with said upper groove defining surface of said groove element, thereby limiting upward protrusion of a top end of said insert into said upper floor surface, the insert further having a threaded bore also extending between the upper groove defining surface and the upper floor surface plane, with a flange at an upper end of the threaded bore; and a set screw threadably received within said bore of said insert and adapted to be tightened in a downward direction independently of said insert to engage and lock said tongue element in said groove element, said flange preventing upward movement of the set screw out of the bore and into the upper floor surface plane.

2. The portable floor of claim 1 wherein said grooved element includes upper and lower legs having surfaces defining said groove, said lower leg having an access aperture formed therein and sized to permit upward introduction therethrough of said insert toward said upper leg.

3. A method of locking adjacently situated sections of a portable floor in interconnected relationship wherein a first one of the adjacently situated sections has a tongue along an edge thereof and a second of the sections has a groove along a corresponding edge thereof sized to receive the tongue and the second section also has a passage extending between an upper surface thereof and the groove, the method comprising the steps of:

locating an insert in a fixed position within the second section above the groove, the insert having a threaded bore extending therethrough and a set screw threadably received therein, the external surface of the insert and the passage of the second section coating to prevent upward protrusion of the insert to the upper surface;

inserting the tongue of the first section into the groove of the second section and aligning top surfaces of said first and second sections in a common floor plane; and tightening said set screw in a downward direction toward said inserted tongue, independently of said insert, in order to engage said inserted tongue and lock said first and second sections together in coupled relationship, and thereby urging said enlarged bottom end in an upward direction, said set screw being accessible for tightening from above said common floor plane.

4. The method of claim 3 wherein said locating step further comprises:

introducing said insert and set screw through an access aperture in a bottom portion of said second section below said groove and moving said insert and set screw upwardly within said section beyond said groove to locate said insert in said fixed position.

5. The method of claim 4 wherein said insert has external threads and further comprising the step of:

threading said insert into said fixed position.

6. Apparatus for locking two floor sections together wherein a first floor section has an upper floor surface and protruding tongue means extending along an edge thereof, a second floor section having an upper floor surface and groove defining means extending along an edge thereof, said groove defining means defining a groove for receiving said tongue means when said sections are oriented together such that said upper floor surfaces reside in substantially the same plane, the locking apparatus comprising:

an insert disposed in said second floor section; and a set screw selectively threaded in said insert for longitudinal movement into a blocking position in said groove to prevent withdrawal of said tongue means from said groove, the insert including an external surface coacting with the second floor section for preventing movement of said insert outwardly of said second floor section into said upper floor surface and the insert further including an internal rim for preventing extension of said set screw outwardly of said second floor section into said upper floor surface thereof.

7. In a tongue and groove coupling for adjacently situated sections of a portable dance floor, one of said sections having two horizontally disposed legs defining a horizontally disposed groove and the other of the sections having a horizontally disposed tongue sized to be received within the groove, said one of said sections further having a passage extending from the groove to an upper surface thereof, the tongue and groove adapted to be coupled together and secured by lock means which includes a set screw and an insert, the improvement comprising:

a lock means receiving aperture formed through a lower one of said groove legs for introducing said lock means upwardly therethrough for final disposition in said respective floor section, the lock means receiving aperture being oversized with respect to the passage.

8. A portable floor comprising:

at least two floor sections adapted to be coupled in side-by-side relationship so that top surfaces thereof lie in an upper floor plane;

a tongue element connected to a first of the floor sections;

a groove element connected to a second of the floor sections, the groove element having a groove sized to receive a tongue of the tongue element, thereby to couple the first and second floor sections in side-by-side relationship, the second section further having a passage therethrough extending between the groove and the upper floor plane;

an insert received within the passage;

a locking screw located within the insert and adapted to be downwardly tightened from above the upper floor plane into engagement with the tongue received within the groove; and the insert further including means for preventing upward protrusion of the insert and the locking screw above the upper floor plane.

9. The floor of claim 8 wherein said means for preventing upward protrusion further comprises:

an internal rim disposed at a top end of the insert above the set screw for restricting upward protrusion of the set screw beyond the top end.

10. The floor of claim 8 wherein said means for preventing upward protrusion includes an enlarged bottom end of the insert coacting with the groove element to prevent said insert from protruding upwardly beyond said upper floor plane.

11. The floor of claim 10 wherein said enlarged bottom end is flared and in surface contact engagement with a correspondingly countersunk surface of said groove element.

12. The floor of claim 10 wherein the groove element has upper and lower legs defining the groove and the lower leg has an aperture formed therethrough aligned with the passage thereabove, the aperture being of equal or greater diameter than the enlarged bottom end of the insert.

13. In a portable floor system of connectable floor sections wherein adjacently situated sections of the floor have corresponding edge located tongue and groove elements for connecting the sections in side-by-side relationship, with top surfaces thereof located in a common upper plane and a locking screw downwardly tightenable from above the common plane through one of the floor sections and into contact with the tongue of one of the floor sections inserted into a groove of the other sections to lock the adjacently situated sections in connected relationship, the improvement comprising:

an insert adapted for disposition in said one section between a surface of a groove defined therein and the common plane thereabove, the insert having a flared bottom end adapted to engage the groove surface to prevent upward protrusion of the insert beyond the common plane and the insert further having an internal bore for receiving the locking screw with an internal rim located at a top end thereof for preventing protrusion of the locking screw threadably received therein beyond the common plane.

14. A portable floor comprising:

at least two floor sections adapted to be coupled in side-by-side relationship so that top surfaces thereof lie in an upper floor plane;

a tongue element connected to a first of the floor sections;

a groove element connected to a second of the floor sections, the groove element having a groove sized to receive a tongue of the tongue element to couple the first and second floor sections in side-by-side relationship, the second section further having a passage formed therethrough between the groove and the upper floor plane;

locking means cooperating with the tongue and groove for locking the first and second sections in coupled relationship, the locking means including:
an insert received within the passage;
a locking screw located within the second section and adapted to be downwardly tightened from above the upper floor plane into engagement with the tongue when received within the groove; and means for retaining the locking means beneath said upper floor plane.

15. The portable floor of claim 14 wherein the means for retaining further comprises:
a flared bottom end of the insert which engages the groove element of the second floor section to prevent upward protrusion of the insert.

16. The portable floor of claim 14 wherein the means for retaining further comprises:
a rim at the top of the insert for preventing upward protrusion of the locking screw.

* * * * *

UNITED STATES PATENT AND TRADEMARK OFFICE
CERTIFICATE OF CORRECTION

PATENT NO.  : 5,070,662
DATED       : December 10, 1991
INVENTOR(S) : Michael W. Niese It is certified that error appears in the above-identified patent and that said Letters Patent is hereby corrected as shown below:

Column 4, line 7, after "1", insert --is--.

Column 7, line 17, change "coating" to --coacting--.

Signed and Sealed this

Twenty-ninth Day of June, 1993

Attest:

MICHAEL K. KIRK

Attesting Officer

Acting Commissioner of Patents and Trademarks